United States Patent Office 3,212,871
Patented Oct. 19, 1965

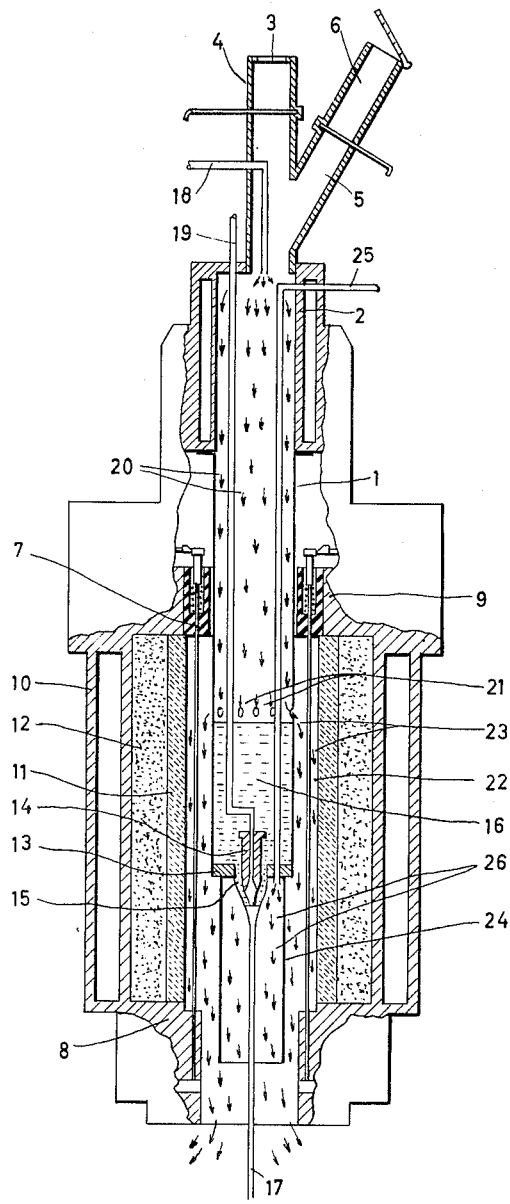

3,212,871
ELECTRICALLY HEATED TANK FURNACE FOR MELTING QUARTZ
Karl Vatterodt, Berlin-Spandau, Germany, assignor to Patent-Treuhand-Gesellschaft für Elektrische Glühlampen m.b.H., Munich, Germany
Filed Dec. 6, 1961, Ser. No. 157,389
Claims priority, application Germany, Dec. 16, 1960, P 26,237
3 Claims. (Cl. 65—157)

This invention relates to an electrically heated tank-furnace for melting quartz, and is an improvement upon the disclosure in my prior U.S. Patent 2,998,469, issued under date of August 29, 1961.

For the purpose of melting quartz, more particularly for continuous manufacture of quartz glass tubing, there are heretofore known electrically heated tank furnaces as exemplified by my hereinabove mentioned patent, which include as principal elements thereof a tubular melting crucible of refractory metal at the bottom of which is a drawing nozzle, the crucible having electrical heating wires and a heat-insulating jacket therearound. The heating wires are located in an annular downwardly open space between said crucible and jacket. The drawing nozzle is formed by a round bottom aperture of the crucible in conjunction with an axial mandrel or core tube of refractory metal. Pipes feeding protective gas lead to said mandrel or tubular core and also into the annular space containing the heating wires as well as into the interior of the crucible above the melt. Such protective gases prevent any reactions of air with the heated parts. The pipes containing the protective gas usually enter the upper portion of the respective space which is to be scavenged by said gas.

The starting material, which for quartz glass tubing is generally rock crystal, is poured into the top of the crucible and gravitates to the bottom thereof, and by virtue of the heat supplied by the heating wires around the crucible, is melted and forms a pool of molten quartz which is known as the melt. Additional rock crystal or other material is introduced into the top of the crucible and covers the melt and is likewise gradually melted and constitutes part of the melt. The drawing nozzle forms the out-flowing melt passing therethrough into a tubular formation which is received by a drawing machine arranged below the furnace, and is drawn to desired size thereby.

Quartz glass tubing made according to the above-outlined prior art method has considerable quantities of small gas bubbles dispersed therein. For many applications of quartz glass tubing, such bubbles are not detrimental or troublesome. However, there are other uses for quartz glass tubing wherewith bubbles cannot be tolerated.

It has been found that in the above-mentioned prior art method utilizing the well known quartz melting furnaces wherein the protective gas is introduced from above into the interior of the crucible above the melt and permitted to escape upwardly only that vapors ascend from the melt and by condensation deposit on the upper cooler parts of the crucible wall. The condensate forms with inclusion of gas as porous mats which, with the included gas, finally fall back into the melt. Thereby bubbles are produced in the melt and pass out through the nozzle dispersed in the quartz constituting the ultimate tube. Except for this detrimental inclusion of bubbles in the finished product, the prior art furnaces and method of manufacture of quartz tubing, are commendable in production of tubing of accurate dimensions.

In its broad aspect, therefore, the present invention proposes utilization of the prior art teaching of continuous formation of exactly dimensioned quartz tubing, but with the improvement of forming such tubing by an improved furnace so as to be substantially bubble-free.

Also in a general approach, the invention is directed to obtaining the foregoing object in a simple manner and with minimum alteration of furnaces heretofore employed.

Fundamentally, the invention provides for elimination of ascension of vapors from the top surface of the melt.

As a corollary to the elimination of ascension of vapors, it is a further object of the invention to immediately remove such vapors from the top surface of the melt.

A further objective of the invention is to utilize the protective gas within the crucible to sweep the objectionable vapors from the surface of the melt.

Specifically, the invention provides lateral holes through the wall of the crucible proximate to the top surface of the melt through which the protective gas laden with the objectionable vapors will discharge into the space exterior to the crucible and thereby prevent the vapors from rising within the crucible and therefore eliminating condensation of the vapors within the crucible.

Other objects, advantages and structural and operational features of the invention will become apparent to persons skilled in the art to which it appertains as the description proceeds, both by direct recitation thereof and by implication from the context.

Before entering upon a more detailed description of the invention, it may be mentioned that a source of raw material for use herein may be derived from low-bubble-content quartz glass produced according to the well known method of blowing rocky crystal in sugar-grain sized pieces by an oxyhydrogen flame against a rotating carrier giving a very pure and hard glass thereon. Exact dimensioning of quartz glass cannot be obtained by that method so it is not adaptable for making tubing.

The single figure of the drawing shows in vertical longitudinal section an embodiment of the invention comprising an electrically heated tank furnace for melting quartz.

In the specific embodiment of the invention illustrated in said drawing, the reference numeral 1 indicates a vertically disposed cylindrical crucible, open at its upper end, made from sheet molybdenum and carried by and depending from an upper correspondingly hollow water-cooled neck 2 of the furnace shell. Coaxial with said neck is an inspection glass 3 conveniently spaced thereabove by an observation tube 4 projecting above said neck coaxially therewith with said glass mounted in the upper end of said tube. At one side of said observation tube appropriately sloping thereinto, is a charging channel 5 for introduction of the raw material as required, such as the above-mentioned rocky crystal quartz, suitable closures being provided at the upper portion of said charging channel to constitute a gas trap 6.

The lower portion of the crucible 1, which constitutes the heating and melting zone thereof, is surrounded by a plurality of heating wires 7 arranged in parallelism to the crucible axis and spaced at equal distances apart circumferentially of said crucible at the outside thereof forming a coaxial cylindrical cage of heating wires. Said heating wires are of tungsten or other desirable metal, and are secured at their lower ends in a lower ring 8 of the furnace shell, and supported and tensioned upwardly by individual springs carried by and appropriately insulated from an upper ring or head 9 of the furnace.

Between said upper and lower rings 8, 9, the furnace shell is provided with a jacket 10 for water cooling purposes. Also at this water-cooled portion of the furnace, the interior hollow thereof is of considerably greater diameter than the diameter of the crucible, not only to provide an annular space to accommodate the cage of heating wires 7 around the crucible, but additionally to receive a cylindrical muffle 11 radially beyond the wires, and an annular heat-insulating layer 12 outside of the muffle between it and the portion of the furnace shell having the water-cooled jacket 10. The muffle may appropriately be composed of solidified zirconium oxide and said layer 12 can be comprised of zirconium oxide powder pressed into the annular cavity between the muffle and shell.

At the bottom of the crucible 1, fitting tightly therein peripherally, is an annular or washer-shaped closure 13 coaxial to the crucible. Partly within the crucible and partly depending therebelow, is a tubular core 14 coaxial to the crucible and closure and of smaller outer diameter than the inner diameter of the opening provided by said annular closure, said core passing through said opening out of contact with the closure and forming therewith an annular drawing nozzle 15.

The raw material, namely the aforesaid quartz glass pieces, are put into the crucible through the charging channel 5 in such a manner that the single pieces remain separated and loose from each other on the surface of melt 16 without any adhesive contact with adjacent quartz glass pieces until they melt. In case of a closer packing of the quartz glass pieces not yet melted on the melt surface, gas inclusions might be formed during melting and enter into the interior of the melt and thereby tend to form bubbles which would appear in the ultimate product.

The melted mass flows as a smooth continuous stream downwardly out of nozzle 15, and by virtue of presence of the core or mandrel 14 the flowing mass will be tubular. This melting furnace, like those in the prior art for manufacture of quartz glass tubing, is operated in connection with a drawing machine which is not here shown. Such drawing machine is arranged below the furnace and continuously draws the tubing which leaves the furnace from nozzle 15, whereby the tubing is formed by appropriate tapering down to desired diameter and wall thickness. The quartz tubing, in its drawn condition comprising the ultimate product is designated by numeral 17.

A gas feed pipe 18 is herein shown entering through the side of observation tube 4 and extends down to the upper end of neck 2 of the furnace and opens downwardly thereat. By means of this pipe 18 an inert protective gas, such as a mixture of hydrogen and nitrogen, is directed downwardly into said neck and consequently downwardly into said crucible. The gas is introduced under appropriate pressure and fills the crucible to the top of the melt, but of course cannot escape upwardly from the charging channel or observation tube. A second gas pipe 19 enters at the top of neck 2 and extends downwardly therethrough and downwardly longitudinally of the crucible to the mandrel or core 14 and feeds a protective inert gas, such as a mixture of hydrogen and nitrogen, into the hollow interior of said core.

The general direction of flow of the protective gas introduced by the first-mentioned pipe 18, is downwardly in the crucible as indicated by arrows 20. Proximate to the top of the melt 16 the crucible is provided with a peripheral series of outlets or holes 21 which connect outwardly with the annular space 22 containing the cage of heating wires 7 at the outside of the crucible. The vapors getting free from the melt 16 are caught by the current of protective gas blanketing the surface of the melt and are taken away by and with that gas through the holes 21 out of the crucible 1. After being removed from the crucible 1, the protective gas and vapor mixture, denoted by arrows 23, scavenges in the annular space 22 around the heating wires 7 so that they are protected against any penetrating air. Because the heating wires 7 as well as the walls enclosing the annular space 22 are very hot, there is no risk of any undesired condensation of vapors contained in the gas current.

It will be appreciated that the quartz leaving the nozzle 15 is fluid in consistency but becomes less and less plastic as it is drawn downwardly therefrom. In its fluid and highly plastic state, the quartz leaving nozzle 15 is capable of reabsorbing the vapors if allowed to come in contact therewith, and such absorption would cloud the otherwise clear crystal. For purpose of preventing the vapor-laden protective gas from making such contact with the quartz tubing in the susceptible area where the quartz is liquid or cooling below the plastic state, a tubular partition wall or sleeve 24 is provided, constituted as a downward extension from the crucible, beginning at the bottom 13 thereof and projecting nearly to the open bottom of the lower end of the furnace. Since the heating wires are in part opposite this partition 24 and the hot quartz is within the partition, involving presence of considerable heat, it is preferable to make said partition of molybdenum.

Protection against contamination of the extruded quartz tubing at and below nozzle 15 is desirable, and to accomplish this objective, another gas-conducting pipe 25 is provided which enters through the furnace neck 2 and extends downwardly longitudinally of the crucible proximate to the inside wall thereof and protrudes through bottom closure 13 ending immediately thereunder. A protective gas, such as a mixture of hydrogen and nitrogen, is fed through this pipe 25 and issues into the interior of sleeve or partition 24 in direction indicated by arrows 26. This gas scavenges the outside of the formed quartz glass tubing and likewise functions to prevent the vapor-laden gas at the outside of the sleeve or partition 24 from entering the bottom end of said sleeve, and having the further beneficial effect of influencing that vapor-laden gas both toward the outer wall and outer end of the bottom end of the space 22. Special mention may also be made calling attention to the fact that both pipe 19 to the mandrel and pipe 25 into the shielding sleeve 24 have portions thereof passing through the molten quartz glass within the crucible and thus the protective gas passing through those pipes will be heated and will not chill the quartz at or below the nozzle 15. It will of course be noted that pipe 19 supplies protective gas to the inside of the quartz tubing and pipe 25 supplies protective gas to the outside thereof, so that the tubing is protected from extraneous containmation both inside and outside during its formative stage, and since the melt surface has the cause of contamination heretofore experienced entirely eliminated, the present furnace and method of manufacture of tubing produces a clear quartz tubing free of bubble content. All of the pipes 18, 19 and 25 supplying the protective gas consist of refractory metal, preferably molybdenum.

With the above described quartz melting furnace, any bubble formation in quartz glass may be substantially prevented. A special advantage of the invention resides in the fact that this object may be obtained without higher expense and that minor alterations only are necessary in the prior art quartz melting furnaces for its accomplishment, viz., provision of the gas outlet holes in the crucible wall proximate to the surface of the melt, provision of the shielding sleeve or partition wall, and location of the protective gas pipe, hitherto located in the annular space between the crucible and furnace shell, to now pass through the crucible and discharge into the said protective shield or partition wall. The number of pipes for feeding the protective gas is not altered from prior art usage, nor is there need for change in the remaining furnace construction. It is noteworthy that the high accuracy in dimensions of quartz glass tubing obtained by hereberfore well known methods, is also obtained in this improved method.

I claim:

1. An electrically heated tank furnace for melting quartz, said furnace having a tubular melting crucible surrounded by heating wires, a drawing nozzle in the lower end of the crucible for continuously drawing quartz glass tubing from the melt in said crucible, means introducing protective gas to the interior of said crucible above the melt therein, characterized in that the crucible wall above and proximate to the melt top surface is provided with a plurality of holes therethrough to the exterior of the crucible for outward passage of said gas whereby vapors getting free from the melt surface are prevented from rising in the crucible but are carried along by the flow of the protective gas escaping through said holes to the outside of the crucible.

2. A furnace in accordance with claim 1, characterized in that below and radially spaced from said drawing nozzle and extending in the same axial direction as the crucible there is provided a tubular partition wall interposed between the formed quartz glass tube and the downwardly flowing mixture of protective gas contaminated by said vapors.

3. A furnace in accordance with claim 2, characterized in that there is provided below and proximate to the drawing nozzle a pipe feeding protecting gas downwardly into the space enclosed by said partition wall producing a downwardly directed flow of protective gas between the formed quartz glass tube and said partition wall.

References Cited by the Examiner
UNITED STATES PATENTS

| | | | |
|---|---|---|---|
| 2,155,131 | 4/39 | Hanlein | 65—157 |
| 2,410,616 | 11/46 | Webb | 65—157 |
| 2,686,212 | 8/54 | Horn et al. | 65—157 X |
| 2,882,648 | 4/59 | Hovgaart et al. | 65—32 |
| 2,892,739 | 6/59 | Rusler | 65—33 X |
| 3,013,362 | 12/61 | Calkins et al. | 65—32 |
| 3,025,191 | 3/62 | Leverton | 65—33 X |

DONALL H. SYLVESTER, *Primary Examiner.*